(No Model.)
G. PHILIPPART.
SECONDARY BATTERY.
No. 425,957.  Patented Apr. 15, 1890.
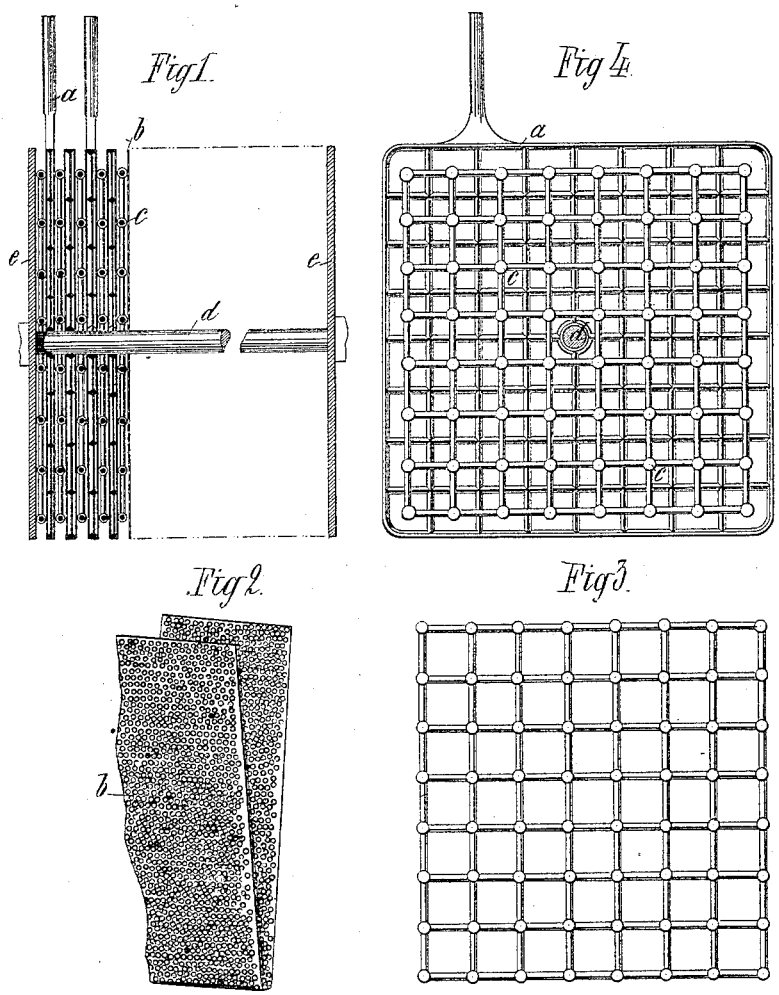
Witnesses:
Hans O. Berg
R. L. Hogue
Inventor:
Gustave Philippart
by Pollok & Mauro
his attorneys

UNITED STATES PATENT OFFICE.

GUSTAVE PHILIPPART, OF PARIS, FRANCE.

SECONDARY BATTERY.

SPECIFICATION forming part of Letters Patent No. 425,957, dated April 15, 1890.

Application filed January 6, 1890. Serial No. 336,061. (No model.)

*To all whom it may concern:*

Be it known that I, GUSTAVE PHILIPPART, a citizen of Belgium, and a resident of Paris, France, have invented certain new and useful Improvements in Electric Storage-Batteries or Accumulators, of which the following specification is a full, clear, and exact description.

This invention relates to a new construction or certain new features of construction in secondary or storage batteries or accumulators.

In order to obtain accumulators by the use of oxides of lead as the active material which shall be capable of sufficiently long usage, it is (or has been) necessary to agglutinate the said material by compression and harden it by sulphatation in order that the same may not detach itself from the cells which it fills. The accumulator-plates are thus furnished with a series of pastiles or monoliths, which offer great resistance to the electrical action. Moreover, the positive plates under the influence of repeated discharges heave, and the active material detaches itself and falls to the bottom of the containing-vessel. It is consequently necessary to wash out the vessel, and this washing removes the powder of reduced lead detached from the element. Without this precaution contacts would be established between two consecutive plates, which would bring about a lowering of the voltaic tension. At the end of a certain number of washings the plate is worn out. To obviate these difficulties is an object of the present invention.

In the accompanying drawings, which form part of this specification, Figure 1 is a partial vertical section of a cell of a storage-battery constructed in accordance with the invention, and Figs. 2, 3, and 4 are detail views of the same.

The cellular plates $a$ (of, say lead alloyed with antimony) have their cells $a'$ filled with the active material (as the oxides or salts of lead) in very pulverulent and non-agglutinated form and its faces covered with a very thin perforated sheet of celluloid or similar material. The sheet of celluloid has a thickness of about one-tenth of a millimeter. It is obtained by slicing thicker plates after the method employed in cabinet-work for making veneers. These sheets are pierced with a very large number of exceedingly small holes to permit the acidulated water to act on the active material.

When the lead plate provided with active material and covered with the celluloid sheets is plunged into, a liquid a very energetic adherence takes place between the celluloid and the active material, and this adherence is vigorously maintained.

Between two consecutive elements of the accumulators is placed a grating, of ebonite or other insulating material, provided with little spheres at the corners of the squares. It is so arranged that the said corners are opposite the cells. By this arrangement the two consecutive elements are prevented from touching and the cores of active material held on both sides or solidly retained in place.

All the plates, sheets of celluloid, &c., are pierced with a central hole, through which is inserted a strip of rubber $d$, connected with two glass plates $e$, placed at the two ends of the accumulator. The elements are bound together by the action of the rubber.

If it is desired to repair a plate which has become inefficient by the exfoliation of the active material, it suffices to cover the element with powder of oxide of lead and to envelop the whole in a thin sheet of celluloid, as already stated. The construction of the accumulator is accomplished by the process hereinbefore described.

It is to be observed that this method is applicable to any form of plate, flat or conical, with cells square, rectangular, or of the most varied or irregular geometrical configuration.

By means of the present invention the following industrial results are secured:

First. It is possible to employ pulverulent active material which gives elements offering but feeble electrical resistance.

Second. The active material is fixed in the cells without impairing the conductibility of the plate.

Third. The repair of plates which have become inefficient may be effected very economically.

I claim as my invention or discovery—

1. An electrode composed of a cellular plate and pulverulent active material in the cells of said plate and provided with a retaining-sheet of celluloid or other material pierced with very numerous and exceedingly small holes, substantially as described.

2. In combination with electrodes having cellular plates filled with active material and perforated retaining-sheets, an insulating-grating separating the said electrodes and provided with swelled portions or projections opposite the cells, substantially as described.

3. In combination with the centrally-perforated electrodes and separating plates or gratings, a strip of rubber inserted through the central perforations and operating to bind together the said electrodes and separating plates or gratings, substantially as described.

4. The electrodes composed of cellular plates of lead alloyed with antimony or of other metal and pulverulent active material in the cells of said plates, and provided with retaining-sheets of perforated celluloid or other perforated material, in combination with the interposed gratings of insulating material having swelled portions or projections opposite the cells, substantially as described.

5. The combination of the electrodes composed of cellular plates filled with active material and covered with retaining-sheets of perforated celluloid or other perforated material, the interposed gratings with swelled portions or projections opposite the cells, and the rubber strip inserted through perforations in the body of said plates, retaining-sheets, and interposed gratings, substantially as described.

In testimony whereof I have signed this specification in the presence of two subscribing witnesses.

GUSTAVE PHILIPPART.

Witnesses:
PAUL GIRAL,
J. L. RATHBONE.